(12) United States Patent
Baxendell et al.

(10) Patent No.: US 9,974,988 B2
(45) Date of Patent: May 22, 2018

(54) MOUNT DE-ACTUATED SAFETY MECHANISM

(71) Applicant: Kidde Technologies, Inc., Wilson, NC (US)

(72) Inventors: Doug John Baxendell, Clayton, NC (US); David William Frasure, Wilson, NC (US)

(73) Assignee: Kidde Technologies, Inc., Wilson, NC (US)

(*) Notice: Subject to any disclaimer, the term of this patent is extended or adjusted under 35 U.S.C. 154(b) by 105 days.

(21) Appl. No.: 15/191,917

(22) Filed: Jun. 24, 2016

(65) Prior Publication Data
US 2017/0368389 A1 Dec. 28, 2017

(51) Int. Cl.
| | |
|---|---|
| A62C 3/07 | (2006.01) |
| A62C 35/02 | (2006.01) |
| F16K 35/06 | (2006.01) |
| A62C 13/64 | (2006.01) |
| A62C 35/13 | (2006.01) |
| A62C 35/68 | (2006.01) |

(52) U.S. Cl.
CPC .............. *A62C 3/07* (2013.01); *A62C 13/64* (2013.01); *A62C 35/023* (2013.01); *A62C 35/13* (2013.01); *A62C 35/68* (2013.01); *F16K 35/06* (2013.01)

(58) Field of Classification Search
CPC ......... A62C 13/62; A62C 13/64; A62C 13/76; A62C 13/78; A62C 3/07; A62C 3/08; A62C 3/10; A62C 35/023; A62C 35/13; A62C 35/68; F16K 35/00; F16K 35/02–35/027

USPC ........... 169/11, 19–22, 30, 62; 251/111, 114, 251/116; 239/583–586
See application file for complete search history.

(56) References Cited

U.S. PATENT DOCUMENTS

| | | | | |
|---|---|---|---|---|
| 4,579,315 A | * | 4/1986 | Kowalski | A62C 3/00 137/624.27 |
| 4,589,496 A | * | 5/1986 | Rozniecki | A62C 35/02 137/68.13 |

(Continued)

FOREIGN PATENT DOCUMENTS

| | | |
|---|---|---|
| EP | 2602521 A2 | 6/2013 |
| JP | H09248349 A | 9/1997 |

OTHER PUBLICATIONS

Extended European Search Report for EP Application No. 17177524.0, dated Aug. 21, 2017, 5 pages.

*Primary Examiner* — Christopher Kim
*Assistant Examiner* — Cody Lieuwen
(74) *Attorney, Agent, or Firm* — Kinney & Lange, P.A.

(57) ABSTRACT

A valve assembly includes a valve with a valve body and chamber. A poppet with a stem and piston is slidably engaged inside the valve body. A poppet release mechanism is included for releasing the poppet from a closed position. A mechanism cover is attached to the valve body. A safety mechanism with a pin, spring, and lever is included for preventing the poppet from moving into a fully open position. A first end of the pin extends into the chamber into a pathway of the poppet and a second end of the pin extends into the valve body of the valve. The spring is positioned between and in contact with the pin and the mechanism cover to bias the pin toward the poppet. A first end of the lever is pivotably attached to the pin and a second end of the lever extends out from the valve body.

6 Claims, 7 Drawing Sheets

(56) References Cited

U.S. PATENT DOCUMENTS

| | | | |
|---|---|---|---|
| 4,763,690 A * | 8/1988 | Martin | F16K 31/1221 |
| | | | 137/613 |
| 5,829,480 A | 11/1998 | Smith, III | |
| 7,083,157 B2 | 8/2006 | Kingsford et al. | |
| 8,033,525 B2 | 10/2011 | Wingett et al. | |
| 8,800,585 B2 | 8/2014 | Jarrell et al. | |
| 8,814,130 B2 | 8/2014 | Lelic et al. | |
| 9,168,406 B2 | 10/2015 | Chaney et al. | |
| 9,200,717 B2 | 12/2015 | Martin | |
| 9,255,643 B2 | 2/2016 | Robinson | |
| 2012/0073839 A1 * | 3/2012 | Thomas, III | A62C 13/76 |
| | | | 169/30 |
| 2013/0025705 A1 * | 1/2013 | Robinson | F16K 35/022 |
| | | | 137/315.27 |

* cited by examiner

MOUNT DE-ACTUATED SAFETY MECHANISM

BACKGROUND

The present disclosure relates generally to a method of and apparatus for the discharge of one or more fire extinguishing agent(s), and more particularly to a valve opening mechanism suited for the rapid discharge of fire extinguishing agent(s) and other high mass flow applications.

Automatic fire extinguishing systems (AFES) are used to rapidly disperse extinguishing agents within a confined space such as the crew compartment of a military vehicle following a fire or explosion event. These AFES are deployed after the explosion event has been detected, typically using high speed infrared (IR) and/or ultra violet (UV) sensors. The AFES typically include a cylinder or canister filled with extinguishing agent and a high rate discharge (HRD) valve which enables rapid and efficient deployment of the fire extinguishing agent throughout the vehicle.

Due to the very high levels of pressure in the canister of AFES, if the HRD valve were to be activated (either through a shock-force during transit, misuse by a user, etc.) before the canister is properly installed in the vehicle, the fire extinguishing agent can exit the canister at an extremely high rate propelling the canister at a high rate of speed and spin which can be potentially dangerous to objects or people in the canister's vicinity.

SUMMARY

A valve assembly includes a valve with a valve body and a chamber. A poppet is positioned in the valve and slidably engaged with the valve body, wherein the poppet comprises a stem and a piston. A poppet release mechanism is included for releasing the poppet from a closed position. A mechanism cover is attached to the valve body. A safety mechanism is included for preventing the poppet from moving into a fully open position unless the safety mechanism is disengaged. The safety mechanism includes a pin, a spring, and a lever. The pin is positioned such that a first end of the pin extends into the chamber of the valve into a pathway of the poppet and a second end of the pin extends into a body of the valve. The spring is positioned between and in contact with the pin and the mechanism cover to bias the pin toward the poppet. A first end of the lever is pivotably attached to the pin and a second end of the lever extends out from the valve body so that the lever will maintain the pin in a blocking position until the second end of the lever is pushed and the first end of the lever translates the pin out of a blocking position and into an un-blocking position.

A fire suppression system includes a pressure container, a mounting bracket, and a high speed valve. The pressure container holds a fire extinguishing agent and includes a neck portion. The mounting bracket receives the pressure container and prevents relative motion between the pressure container and the mounting bracket. The high speed valve is connected to the pressure container and includes a valve body, a poppet, a pin, and a lever. The valve body has a flow passage from an inlet connected to the pressure container to an exit port of the high speed valve. The poppet is disposed within the valve body and is movable between a fully closed position in which the poppet fully blocks the flow passage, a partially open position in which the poppet partially opens the flow passage, and a fully open position in which the poppet fully opens the flow passage. The poppet includes a piston connected to a stem at a distal end of the stem. The pin is positioned such that a first end of the pin extends into a chamber of the high speed valve into a pathway of the poppet and a second end of the pin extends into a body of the high speed valve. The pin is movable between a blocking position in which the pin blocks the poppet from fully opening the flow passage and an un-blocking position in which the pin is removed from a pathway of the poppet to allow the poppet to fully open the flow passage. The lever is pivotably attached to the pin for moving the pin out of the pathway of the poppet to permit the poppet to fully open the flow passage. A first end of the lever engages the pin and a second end of the lever extends out from the valve body and spans across the neck portion of the pressure container. The second end of the lever engages with the mounting bracket when the pressure container is drawn into the mounting bracket, the lever is pushed by the mounting bracket, and the first end of the lever translates the pin out of a blocking position and into an un-blocking position.

A fire suppression system for a vehicle with a wall includes an extinguisher and a mounting bracket. The extinguisher includes a pressure container and a valve assembly. The valve assembly is threadably engaged with a neck portion of the pressure container and includes a valve, a pin, a lever, and an exit port. The valve includes a poppet and a chamber. The pin is positioned such that a first end of the pin extends into the chamber of the valve into a pathway of the poppet and a second end of the pin extends into a body of the valve. The pin is movable between a blocking position in which the pin blocks the poppet from moving into a fully open position and an un-blocking position in which the pin is removed from a pathway of the poppet to allow the poppet to fully open the flow passage. The lever includes a pivot and is pivotably attached to the pin. A first end of the lever engages the pin and a second end of the lever extends out from the valve body and spans across the neck portion of the pressure container. The exit port is in fluid communication with the chamber. The mounting bracket receives the fire suppression system and prevents relative motion between the fire suppression system and the wall of the vehicle. A lip extends outwards from a base portion of the mounting bracket for engagement with the second end of the lever to cause the first end of the lever to translate the pin out of a blocking position and into an un-blocking position.

DETAILED DESCRIPTION

Figure 1:
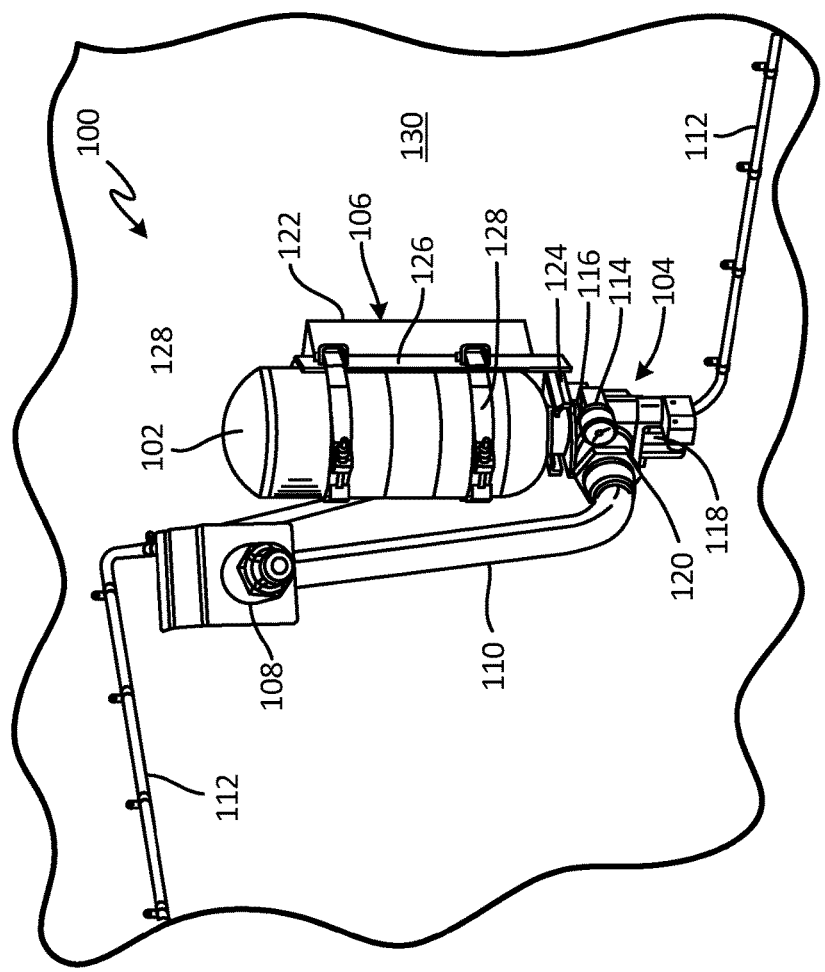
FIG. 1 is a perspective view of a fire suppression system with an HRD valve.

FIG. 1 is a perspective view of fire suppression system 100. Fire suppression system 100 includes pressure container 102, releasing mechanism 104, mounting bracket 106, nozzle 108, conduit 110, and electrical line 112. Releasing mechanism 104 includes valve assembly 114 with HRD valve 116, solenoid actuator 118, and exit port 120. Mounting bracket 106 includes base portion 122, lip 124, channel 126, and arms 128. Also shown in FIG. 1 is wall 130 to which first suppression system is attached.

Pressure container 102 includes a cylinder or canister filled with a fire extinguishing agent. In one non-limiting embodiment, pressure container 102 can be super-pressurized with nitrogen, or other inert gas or a combination of inert gasses. In some non-limiting embodiments, pressure container 102 is made from steel or a similarly high strength, rigid material to contain the pressurized fire extinguishing agent.

Releasing mechanism 104 includes valve assembly 114 with HRD valve 116, solenoid actuator 118, and exit port 120. HRD valve 116 includes a high rate discharge valve, which enables rapid and efficient deployment of the fire extinguishing agent from pressure container 102. Solenoid actuator 118 includes an actuator such that the actuation functionality of solenoid actuator 118 is based on an electric current applied to solenoid actuator 118 and creating a magnetic field in response to the applied current. Solenoid actuator 118 is built into valve assembly 114 and is housed within HRD valve 116. Exit port 120 includes an orifice in HRD valve and an extension with threads.

Mounting bracket 106 includes base portion 122, lip 124, channel 126, and arms 128. Base portion 122 includes a piece of material with an attachment means for attaching mounting bracket 106 to wall 130 of the vehicle. Lip 124 includes a piece of solid material extending out from base portion 122. In one non-limiting embodiment, lip 124 includes a generally U-shaped configuration. Channel 126 includes a generally U-shaped sheet of material extending from a bottom of mounting bracket 106 to a top of mounting bracket 106. Channel 126 is shaped to receive pressure container 102. Arms 128 include solid arms extending in a generally circular fashion. Arms 128 include strips of solid material in the form of arcs partially extending around a circumference of a circle.

Nozzle 108 includes a nozzle for expelling the fire extinguishing agent from first suppression system 100. Nozzle 108 includes a circular component, as well as an inlet for receiving the fire extinguishing agent, and an outlet for expelling the fire extinguishing agent. Conduit 110 includes a hose or pipe. Electrical line 112 includes a line of communication to a controller of first suppression system 100. Electrical line 112 can include a tube containing electrical wires. Electrical line 112 can be attached or otherwise fastened to wall 130 of the vehicle. Electrical line 112 includes two portions as shown in FIG. 1, the first portion extending downwards from releasing mechanism 104 and the second portion extending upwards above pressure container 102.

Fire suppression system 100 is attached to wall 130 of the vehicle. More specifically, mounting bracket 106 of fire suppression system 100 can be adhered, fastened, or otherwise attached to wall 130.

Pressure container 102 is connected to mounting bracket 106 through being contained by channel 126 and arms 128. Pressure container 102 is in contact with channel 126 and is secured to mounting bracket by arms 128 that reach around pressure container 102 and attach to themselves to create a secure confinement of pressure container 102. Pressure container 102 is usually fitted vertically (that is with its longitudinal axis extending vertically), or as close to vertical as possible, within an enclosed or confined area of the vehicle. The vertical orientation of pressure container 102 allows releasing mechanism 104 at the outlet of pressure container 102 to be located at the lowest point. In one embodiment, the fire extinguishing agent lies at the bottom of pressure container 102 (due to its relatively high density), with the nitrogen or a similar fluid pressurizing the space above.

Releasing mechanism 104 is connected to pressure container 102 by having HRD valve 116 of valve assembly 114 threadably engage with pressure container 102. Releasing mechanism 104 is attached to pressure container 102 at a bottom of pressure container 102 as shown in FIG. 1.

Mounting bracket 106 receives pressure container 102 and prevents relative motion between fire suppression system 100 and wall 130 of the vehicle. Lip 124 can be physically connected to base portion 122 by chemical or mechanical attachment. Arms 128 are pivotally attached to channel 126 or base portion 122 such that arms can rotate around pressure container 102 when pressure container 102 is placed into channel 126.

Nozzle 108 is attached to a distal end of conduit 110 opposite from valve assembly 114. In order for the fire extinguishing agent to be distributed homogenously within the confined area without adversely impacting personnel or equipment, nozzle 108 can be extended to the highest point of the vehicle, such as where wall 130 meets a roof of the vehicle. This is achieved in fire suppression system 100 by connecting nozzle 108 to releasing mechanism 104 via conduit 110 of an appropriate length of hose or pipe.

Conduit 110 is attached to releasing mechanism 104 at exit port 120 of valve assembly 114. Conduit 110 is threadably engaged with exit port 120.

Electrical line 112 is attached to releasing mechanism 104. The electrical wires inside of electrical line 112 are fed into valve assembly 114 for electrically controlling HRD valve 116.

Releasing mechanism 104 can be opened by solenoid actuator 118. When releasing mechanism 104 is opened, the pressurizing fluid expands and rapidly forces the extinguishant through HRD valve 116, along conduit 110, and out of nozzle 108. When releasing mechanism 104 is opened, the fire extinguishing is expelled at a high rate of discharge (typically in milliseconds).

The interaction of lip 124 with releasing mechanism 104 is discussed with respect to FIGS. 3A-3D.

The resultant force from the discharge of the pressurized gas and liquid is extremely high, requiring a very robust mounting bracket 106 both for pressure container 102 as well as exit port 120. (See FIG. 1). Fire suppression system 100 discharges the pressurized gas and liquid at the same velocity, whether opened electrically, manually, or in some cases, due to a very high shock. A shock load high enough to cause release mechanism 104 to release is nearly impossible when mounted in the inverted position as seen in FIG. 1, however great care is required in transport and handling of fire suppression system 100, where a drop could jar release mechanism 104 enough to cause release mechanism 104 to be released. Because of the sensitivity of the release and extremely high force at which pressure container 102 discharges, an anti-recoil cap is used whenever pressure container 102 of fire suppression system 100 is transported, during installation into bracket 106, removal from bracket 106, or stored. If pressure container 102 of fire suppression system 100 discharges from a shock, exit port 120 is capped with an anti-recoil cap, which limits the amount of flow, as well as directs the discharge in two opposing directions, cancelling any small resultant forces. If an unrestrained HRD valve is accidentally actuated with the anti-recoil cap removed, the results could be potentially dangerous. Aside from the resulting launching action of pressure container 102 of fire suppression system 100, the position of exit port 120 being a distance from the center of gravity, causes pressure container 102 of fire suppression system 100 to spin as it jettisons away, potentially causing damage to anything in the chaotic path of pressure container 102.

Figure 2A:
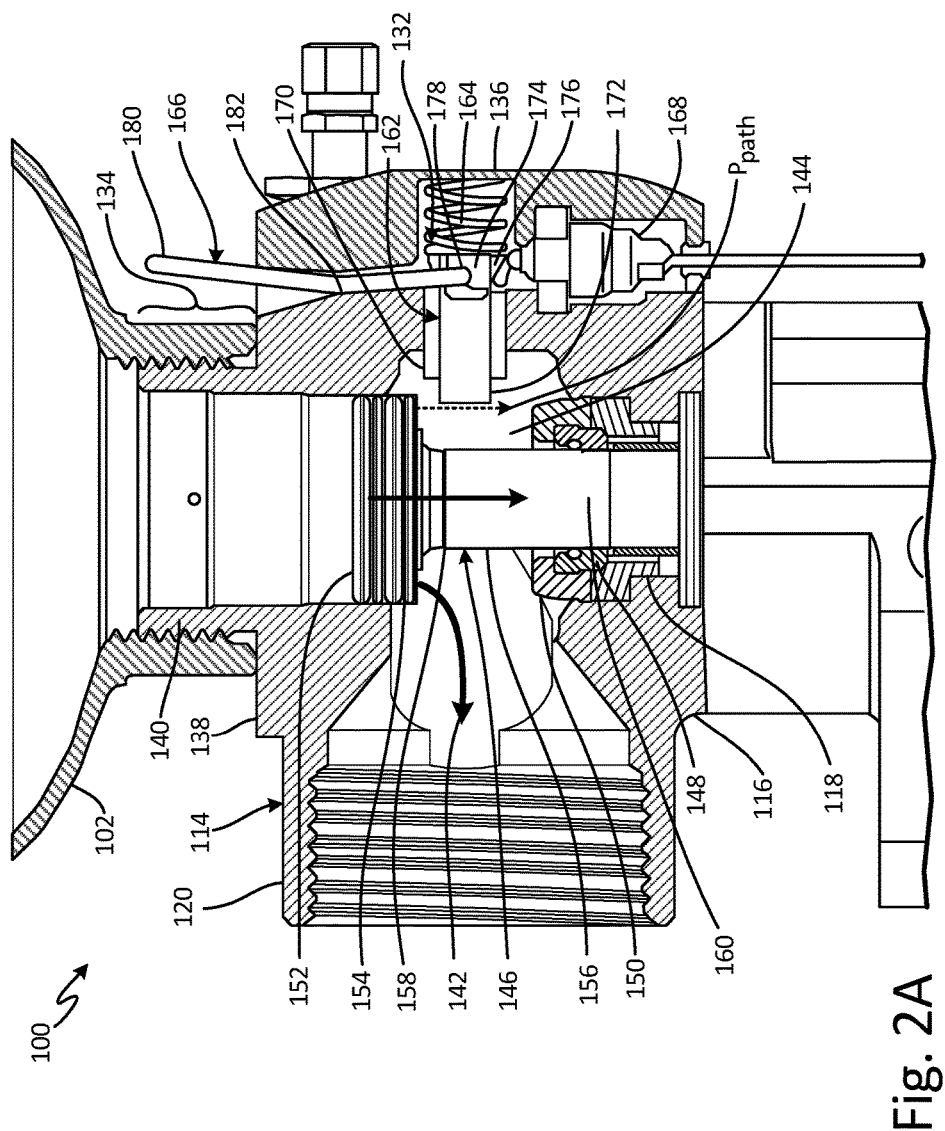
FIG. 2A is a partial cross-sectional view of a pressure container and a valve assembly of the fire suppression system with a safety mechanism in a first position and the HRD valve closed.

FIG. 2A is a partial cross-sectional view of pressure container 102 and valve assembly 114 of fire suppression system 100 from FIG. 1 shown with safety mechanism 132 in a first position and poppet 146 of HRD valve 116 in a closed position. In addition to the elements discussed with reference to FIG. 1, fire suppression system 100 additionally includes the following elements. Pressure container 102 includes neck portion 134. Valve assembly 114 includes HRD valve 116, mechanism cover 136, and safety mechanism 132. HRD valve includes valve body 138, inlet 140, flow passage 142, chamber 144, poppet 146, poppet release mechanism 148, and elastomeric bumper 150. Poppet 146 includes piston 152 with O-rings 154 and stem 156 with distal end 158 and proximal end 160. Safety mechanism 132 includes pin 162, spring 164, lever 166, sensor 168, and bushing 170. Pin 162 includes first end 172, second end 174, and angled portion 176. Lever 166 includes first end 178, second end 180, and pivot 182.

Neck portion 134 includes an orifice in pressure container 102 for guiding pressurized fluids out of pressure container 102. Neck portion 134 extends outwards from pressure container 102 and includes threading along an internal circumferential surface of neck portion 134.

Valve assembly 114 includes an assembly for controlling the flow of a pressurized fluid through valve assembly 114. HRD valve 116 includes a high rate discharge valve which enables rapid and efficient deployment of pressurized fluid to be released through HRD valve 116. HRD valve 116 contains valve body 138 with an elongate bore on a vertical axis that terminates with an opening that forms inlet 140. Valve body 138 also contains chamber 144 that communicates laterally with exit port 120. Flow passage 142 extends through chamber 144 and out through exit port 120. Valve body 138 of HRD valve 116 is constructed from a metal alloy, or similarly rigid material. HRD valve 116 also contains poppet release mechanism 148, as well as solenoid actuator 118 for actuating the internal regulating mechanisms of HRD valve 116 such as poppet 146 within HRD valve 116.

Poppet 146 contains piston 152 connected to stem 156 of poppet 146 at distal end 158 of stem 156. Poppet 146 is a valve element for sealing engagement with inlet 140 for the prevention of fluid transmission past poppet 146 when poppet 146 occupies a fully closed position. Poppet 146 is capable of occupying a fully closed position, a partially open position, or a fully open position.

Poppet release mechanism 148 includes an electromagnet with an armature with retaining fingers for holding poppet 146 stationary in a fully closed position. Elastomeric bumper 150 includes an annulus of resilient material capable of absorbing a shock load of poppet 146 when poppet 146 is released. Piston 152 of poppet 146 includes a cylinder of solid material with channels for receiving O-rings 154. O-rings 154 include sealing elements for creating a seal between piston 152 and inlet 140.

Mechanism cover 136 includes a solid piece of material attached or fastened to a side of HRD valve 116. Mechanism cover 136 includes a cavity for housing a portion of safety mechanism 132, and additionally contains a portion of safety mechanism 132.

Pin 162 includes a generally cylindrical piece of solid material which can include steel or other types of rigid metal. Pin 162 also includes angled portion 176 which is configured to come into, or out of, contact with sensor 168 as pin 162 is moved between a blocking position and a closing position. Spring 164 includes a spring element for biasing pin 162 into a closed position. Spring 164 can include a resilient metallic material. Lever 166 includes an elongate solid piece of material extending between first end 178 and second end 180. Pivot 182 of lever is generally positioned part-way between first end 178 and second end 180.

Sensor 168 includes an electronic sensor for sensing contact between sensor 168 and angled portion 176 of pin 162. Sensor 168 creates an electronic signal when an object is in contact with sensor 168, and another electronic signal when there is no object in contact with sensor 168. Bushing 170 includes a sleeve of solid pliable material for absorbing a force from pin 162. Bushing 170 can include a malleable metallic material.

Neck portion 134 of pressure container 102 is threadably engaged and attached to inlet 140 of HRD valve 116.

HRD valve 116 is fluidly connected to pressure container 102 by a flow path formed through the threadable engagement between inlet 140 on HRD valve 116 and neck portion 134 of pressure container 102. Inlet 140 of HRD valve 116 is fluidly connected to chamber 144 when poppet 146 occupies a partially or fully open position. Chamber 144 of HRD valve is fluidly connected to exit port 120 of HRD valve 116. When poppet 146 occupies a partially or fully open position, flow passage 142 fluidly connects pressure container 102 to exit port 120 of HRD valve through neck portion 134, inlet 140, chamber 144, and through to exit port 120.

Poppet 146 is disposed within valve body 138 such that poppet 146 is movable between a fully closed position in which poppet 146 blocks flow passage 142, a partially open position in which poppet 146 partially blocks flow passage 142, and a fully open position in which poppet 146 fully opens flow passage 142. In FIG. 2A, poppet 146 is shown in a fully closed position.

O-rings 154 surround piston 152 around a circumference of piston 152. O-rings 154 also are in contact, or sealing engagement, with inlet 140 of HRD valve when poppet 146 occupies a fully closed position. Piston 152 is disposed on distal end 158 of stem 156 (in an upward direction in FIG. 2A) opposite proximal end 160 of stem 156 that extends into valve body 138 (in a downward direction in FIG. 2A).

Poppet release mechanism 148 surrounds a portion of proximal end 160 of stem 156 of poppet 146. Poppet release mechanism 148 engages with poppet 146 for holding poppet 146 stationary in a fully closed position. Elastomeric bumper 150 surrounds a portion of stem 156 of poppet 146 and is affixed to valve body 138. When poppet 146 occupies a fully closed position (as shown in FIG. 2A), piston 152 of poppet 146 does not come into contact with elastomeric bumper 150. When poppet 146 occupies a fully open position, piston 152 of poppet 146 comes into contact with elastomeric bumper 150.

Mechanism cover 136 is attached or fastened to HRD valve 116 and contains sensor 168, spring 164, and a portion of lever 166 against HRD valve 116. Safety mechanism 132 is partially positioned between mechanism cover 136 and HRD valve with a portion of safety mechanism 132 extending into chamber 144 of HRD valve 116.

Pin 162 of safety mechanism 132 is positioned such that first end 172 of pin 162 extends into chamber 144 of HRD valve 116 into pathway $P_{path}$ of poppet 146 and second end 174 of pin 162 extends into valve body 138 of HRD valve 116 and partially into mechanism cover 136. A major axis of pin 162 is oriented perpendicular to a major axis of poppet 146. Pin 162 is movable between a blocking position in which pin 162 blocks poppet 146 from moving into a fully open position to open flow passage 142 and an un-blocking position in which pin 162 is removed from pathway $P_{path}$ of poppet 146 to allow poppet 146 to fully open flow passage 142. Angled portion 176 of pin 162 is positioned on second end 174 of pin 162. As shown in FIG. 2A, angled portion 176 of pin 162 is in contact with sensor 168. In other non-limiting examples, angled portion 176 of pin 162 can be out of contact with sensor 168 as pin 162 actuates out of a blocking position (as shown in FIG. 2A) and into an un-blocking position (as shown in FIG. 3C). Spring 164 is positioned between and in contact with pin 162 and mechanism cover 136. Spring 164 biases pin 162 towards poppet 146 and into chamber 144 of HRD valve 116. A spring force of spring 164 is high enough that a handler cannot easily deactivate safety mechanism 132 by mistake.

First end 178 of lever 166 is pivotably attached to pin 162 and second end 180 of lever 166 extends out from valve body 138. Pivot 182 of lever 166 is positioned between first and second ends 178 and 180 of lever 166 such that as second end 180 of lever 166 is moved, first end 178 of lever 166 is moved and pin 162 is translated. Lever 166 extends across neck portion 134 of pressure container 102 that spans across a length of inlet 140 of HRD valve 116.

Sensor 168 is disposed in valve body 138 and adjacent to pin 162. Sensor 168 identifies a position of pin 162 by sensing whether pin 162 is in contact with sensor 168. Sensor 168 can be electronically connected to an instrument panel in the vehicle. Bushing 170 is disposed in valve body 138. Bushing 170 surrounds pin 162 and can include a malleable metallic material for absorbing a force of poppet 146 as poppet 146 is released with pin 162 still in a blocking position.

HRD valve 116 includes poppet 146 which closes off inlet 140 of HRD valve 116 connected to pressure container 102. One or more annular grooves in poppet 146 hold O-rings 154 which compress against inlet 140 of HRD valve 116, providing a good seal. A pressure inside pressure container 102 pushes against poppet 146, forcing poppet 146 downward. By mechanically constraining poppet 146 from being blown out of inlet 140 by poppet release mechanism 148, valve assembly 106 remains sealed and high pressure contents remain in pressure container 102. Poppet release mechanism 148 includes an electromagnet with an armature that slams away a ring which constrains retaining fingers that hold poppet 146 in a fully closed position. Once poppet 146 is released, poppet 146 is pushed downward by a pressurized gas and liquid (such as a fire extinguishing agent) contained inside pressure container 102 allowing the pressurized gas and liquid to escape through neck portion 134, past inlet 140, along flow passage 142, and out exit port 120.

Elastomeric bumper 150 dampens the operation of and prevents damage to poppet 146 and valve body 138 by absorbing a shock load from poppet 146 as poppet 146 is forced downward towards valve body 138. In some non-limiting embodiments, fire suppression system 100 can include a manual pull release for cases where an electrical signal may have been prevented from reaching the electromagnet.

Safety mechanism 132 of HRD valve 116 prevents poppet 146 from fully opening if pressure container 102 is not correctly constrained in mounting bracket 106 by preventing rapid discharge of the fire extinguishant would be prevented in cases of an accidental activation due to electrical actuation, manual actuation, or high shock. When pin 162 occupies a blocking position (as shown in FIG. 2A) such that pin 162 is spring loaded into path $P_{path}$ of poppet 146, pin 162 prevents poppet from opening into a fully open position and instead allows poppet 146 to move in a limited extent and into a partially open position. Preventing poppet 146 from fully opening prevents pressure container 102 from accidentally being propelled by released pressure out of exit port 120 thereby greatly limiting any potentially damaging effects pressure container 102 has if poppet release mechanism 148 accidentally releases poppet 146.

If poppet release mechanism 148 is accidentally actuated, the impact force from the acceleration of poppet 146 can be extremely high and can do considerable damage to pin 162, requiring that valve body 138 be rebuilt and impacted parts be replaced. Bushing 170 helps to prevent shearing, by absorbing the shock load from poppet 146 coming into contact with pin 162. Bushing 170 allows enough deceleration distance that the impact force will be reduced enough such that there would be no shearing or shattering of the components of valve assembly 114 such as pin 162 or valve body 138.

Figure 2B:
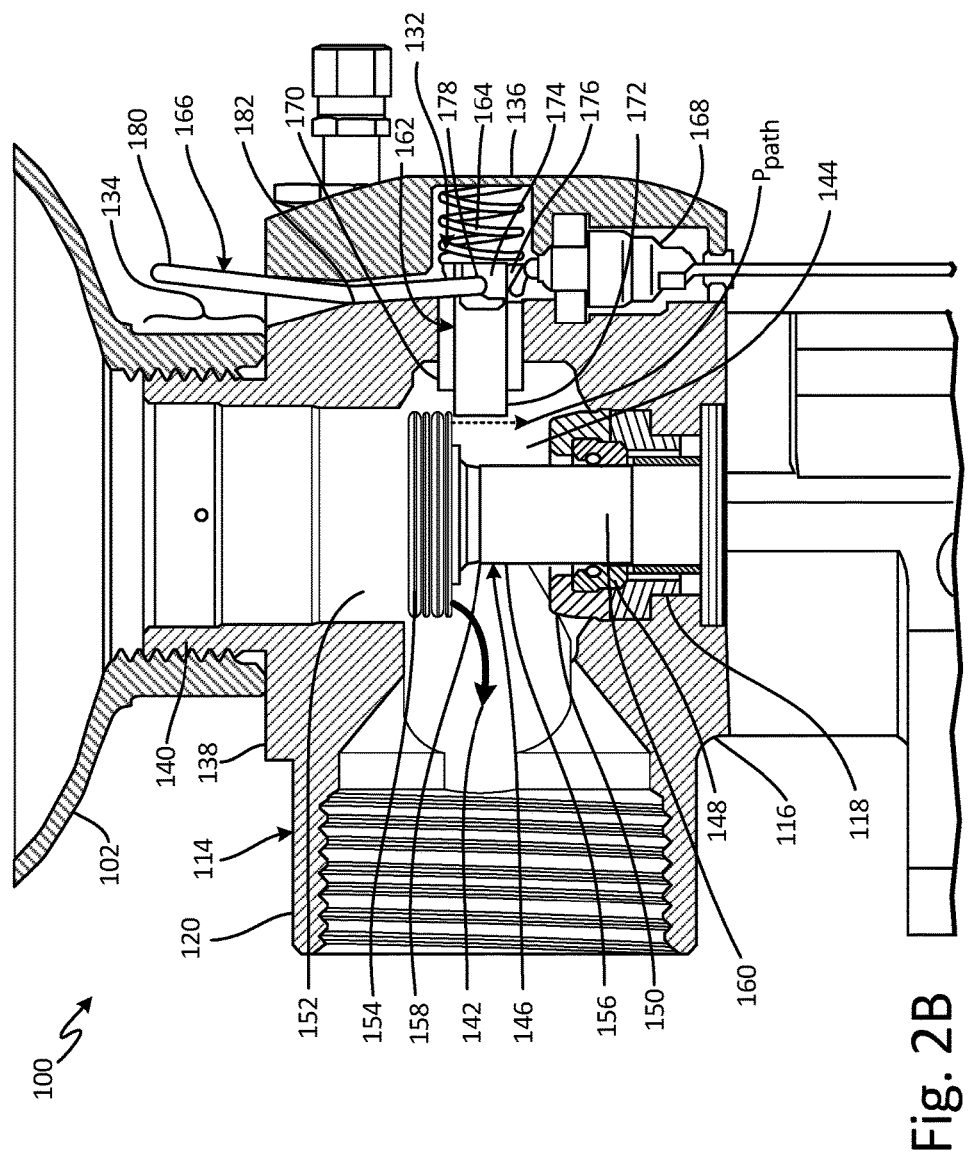
FIG. 2B is a partial cross-sectional view of the pressure container and the valve assembly of the fire suppression system with the safety mechanism in a first position and the HRD valve closed.

FIG. 2B is a cross-sectional view of pressure container 102 and valve assembly 114 of fire suppression system 100 from FIGS. 1 and 2A with safety mechanism 132 in an un-engaged position and poppet 146 of HRD valve 116 in a partially open position. In FIG. 2B, poppet 146 is shown as having been released and has come into contact with pin 162. Due to pin 162 occupying a blocking position such that first end 172 of pin 162 of pin 162 being positioned in pathway $P_{path}$ of poppet 146, movement of poppet 146 has been stopped by pin 162 and poppet 146 has been prevented from moving into a fully open position. Poppet 146 is shown in FIG. 2B to occupy a partially open position which allows a force of the impact between pin 162 and poppet 146 to be absorbed by bushing 170 in valve body 138.

A method of operating fire suppression system 100 with pressure container 102 and valve assembly 114 can, as shown in FIGS. 2A and 2B, include actuating poppet release mechanism 148 of HRD valve 116. Poppet 146 of HRD valve 116 can be released. Pin 162 can be contacted by poppet 146, such that a portion of pin 162 is positioned in pathway $P_{path}$ of poppet 146. Movement of poppet 146 can be stopped with pin 162. Stopping movement of poppet 146 with pin 162 can include absorbing a force of an impact between pin 162 and poppet 146 with bushing 170 that surrounds at least a portion of pin 162. Poppet 146 is stopped from moving into a fully open position. Poppet 146 can be moved to a partially open position releasing a portion of an extinguishing agent from pressure container 102 at a reduced flow rate which is less than a full flow rate of pressure container 102 when poppet 146 is moved into a fully open position and flow passage 142 is fully opened.

Figure 3A:
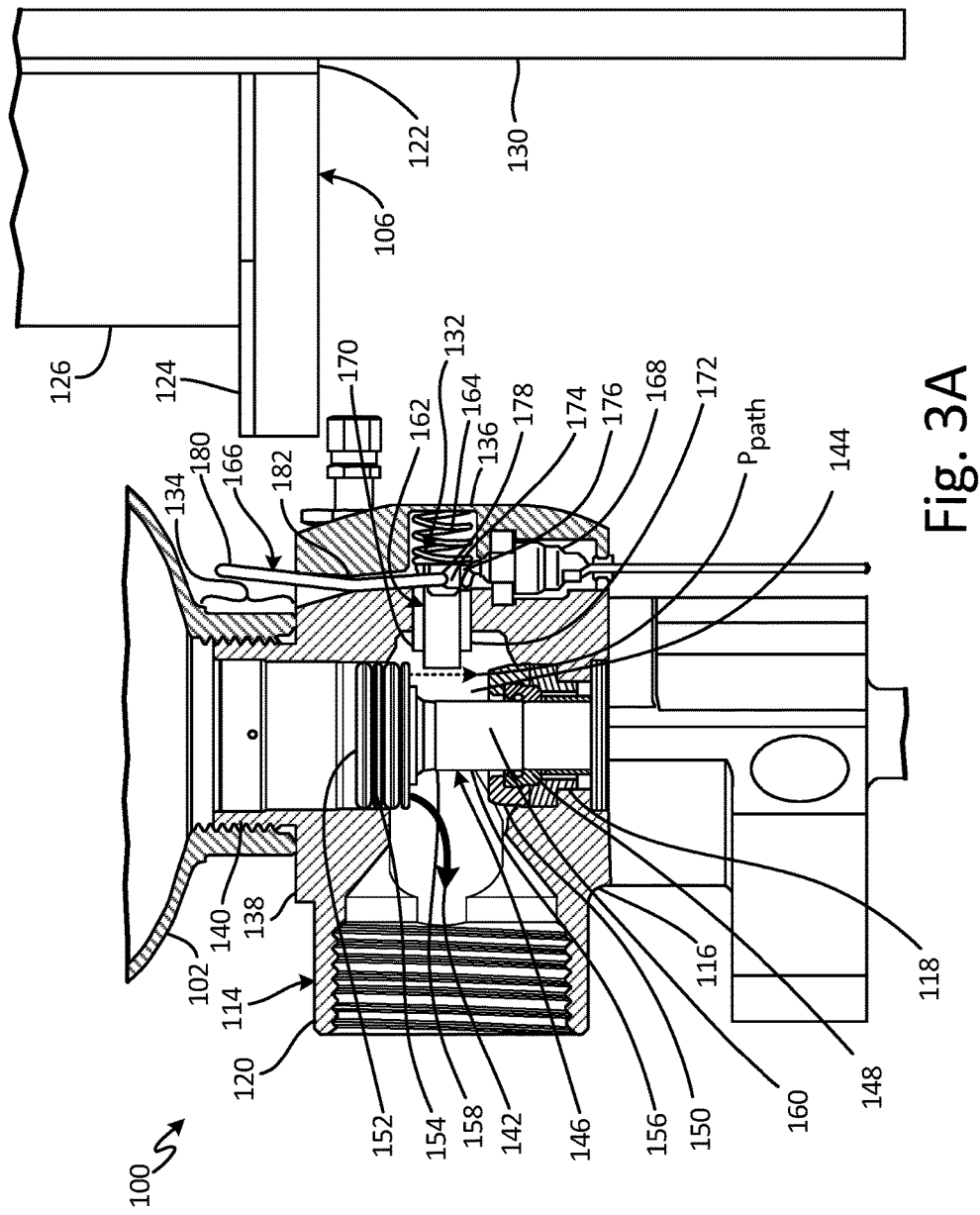
FIG. 3A is a cross-sectional view of the pressure container, the valve assembly, and a mounting bracket of the fire suppression system with the valve assembly in a first, disengaged position.

FIG. 3A is a cross-sectional view of pressure container 102, valve assembly 114, and mounting bracket 106 of fire suppression system 100 that is attached to wall 130, with valve assembly 114 in a first, disengaged position. Pressure container 102 and valve assembly 114 of FIG. 3A include all of the elements discussed with respect to FIGS. 2A and 2B. In addition to pressure container 102 and valve assembly 114, FIG. 3A includes mounting bracket 106. As shown in FIG. 3A, mounting bracket 106 includes base portion 122, lip 124, and channel 126 as discussed in FIG. 1.

Mounting bracket 106 includes lip 124 extending outwards from base portion 122 of the mounting bracket for engaging with lever 166. Lip 124 is aligned with second end 180 of lever 166 such that as pressure container 102 is drawn into mounting bracket 106 (as discussed with FIG. 3B), lip 124 will be pressed into lever 166. FIG. 3A shows lever 166 in an un-engaged position.

The configuration (and required alignment) of pressure container 102, valve assembly 114, and mounting bracket 106 ensure that only upon correct installation of pressure container 102 in mounting bracket 106 such that lip 124 pushes lever 166 from an un-engaged position into an engaged position, will safety mechanism 132 become deactivated and pin 162 be drawn out of pathway $P_{PATH}$ of poppet 146 allowing poppet 146 to activate into a fully open position. The spring force of safety mechanism 132 is high enough that a user cannot easily deactivate safety mechanism 132 by mistake when pressure container 102 is not correctly mounted in mounting bracket 106.

Additionally, with second end 180 of lever 166 extending across neck portion 134 of pressure container 102, pressure container 102 can be installed in mounting bracket 106 in a range of axial positions (in an up and down direction in FIG. 3A). The extended length of lever 166 across neck portion 134 of pressure container ensures that safety mechanism 132 will be deactivated regardless of the axial mounting position of pressure container 102 in mounting bracket 106, so long as lip 124 is generally aligned with neck portion 134 of pressure container 102 during installation of pressure container 102 in mounting bracket 106.

Figure 3B:
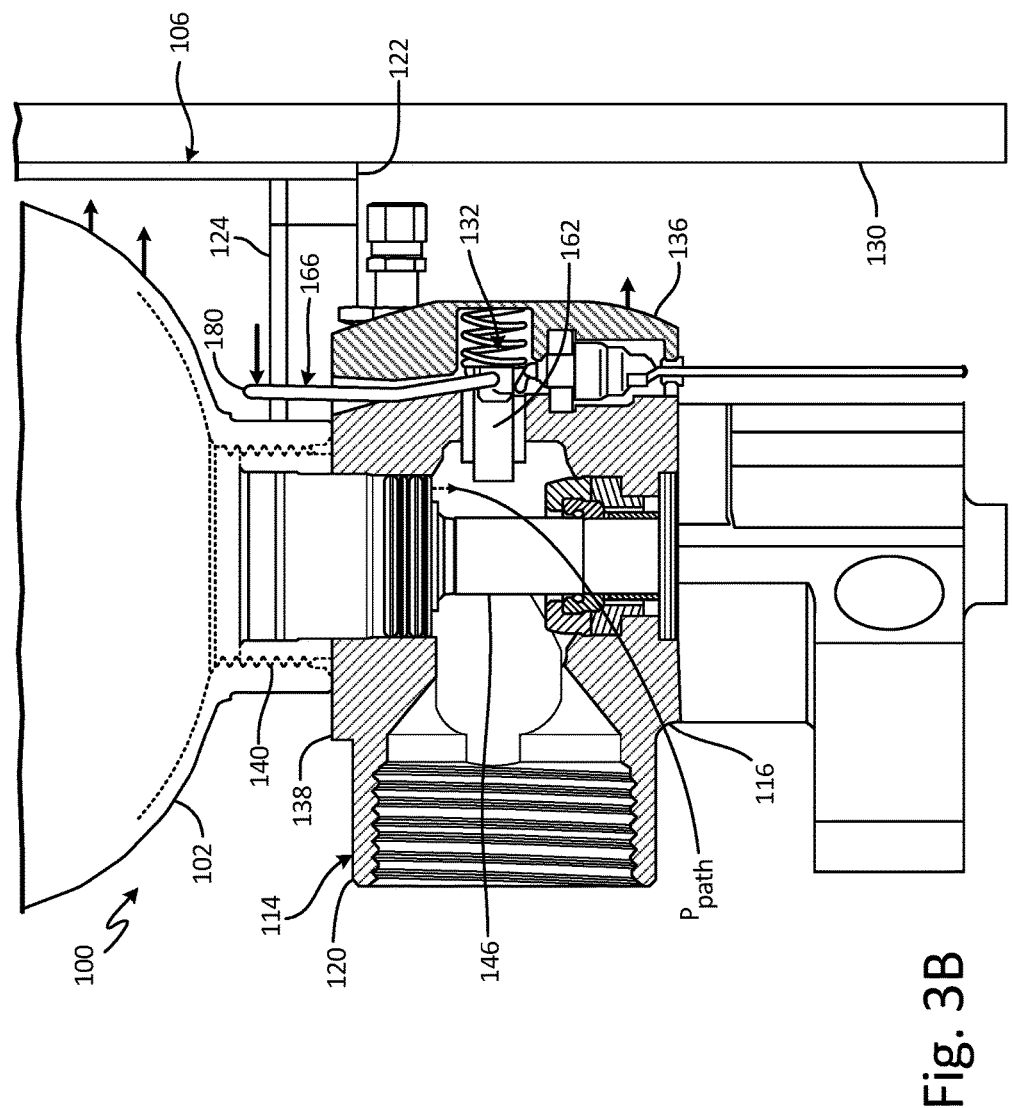
FIG. 3B is a cross-sectional view of the pressure container, the valve assembly, and the mounting bracket of the fire suppression system with the valve assembly in a second, partially engaged position.
Figure 3C:
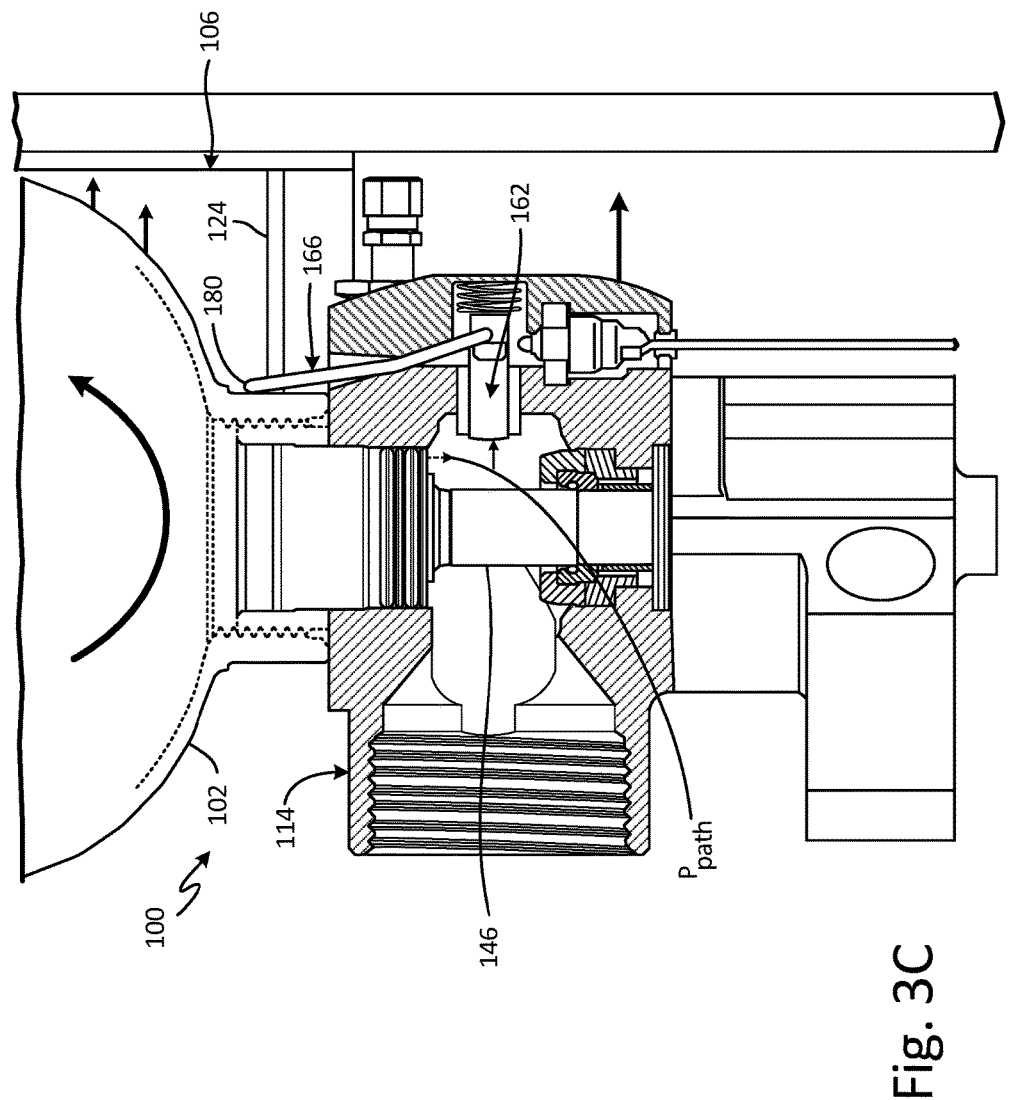
FIG. 3C is a cross-sectional view of the pressure container, the valve assembly, and the mounting bracket of the fire suppression system with the valve assembly in a third, engaged position.

FIG. 3B is a cross-sectional view of pressure container 102, valve assembly 114, and mounting bracket 106 with valve assembly 114 in a second partially engaged position. In FIG. 3B, lip 124 is pressed into second end 180 of lever 166 as pressure container 102 is drawn into mounting bracket 106. As lip 124 is pressed into second end 180 of lever 166, lever 166 is pivoted relative to HRD valve 116. As lever 166 is pivoted relative to HRD valve 116, pin 162 is being translated from a blocking position toward an un-blocking position out of pathway $P_{path}$ of poppet 146 of HRD valve 116. In 3B, pin 162 is still in the blocking position.

When pressure container 102 is mounted correctly in mounting bracket 106 (as shown through the progression of FIGS. 3A-3D), lip 124 of mounting bracket 106 presses lever 166, which pivots relative to HRD valve 116, translating pin 162 out of pathway $P_{path}$ of poppet 146.

FIG. 3C is a cross-sectional view of pressure container 102, valve assembly 114, and mounting bracket 106 with valve assembly 114 in a third, engaged position. FIG. 3C shows lever 166 completely pivoted and in an engaged position. Pin 162 has been translated to an un-blocking position and out of pathway $P_{path}$ of poppet 146.

Once pressure container 102 and valve assembly 114 are correctly mounted to mounting bracket 106 and lever 166 is completely pivoted by lip 124, as shown in FIG. 3C, pressure container 102 with valve assembly 114 can be rotated relative to mounting bracket 106. Rotation of pressure container 102 with valve assembly 114 enables the user to mount pressure container 102 in a range of directions in different vehicles. An anti-recoil cap (not shown in FIG. 3C) is removed from exit port 120 of HRD valve 116 after installation is completed and arms 128 are securely holding pressure container 102 in bracket 106.

Figure 3D:
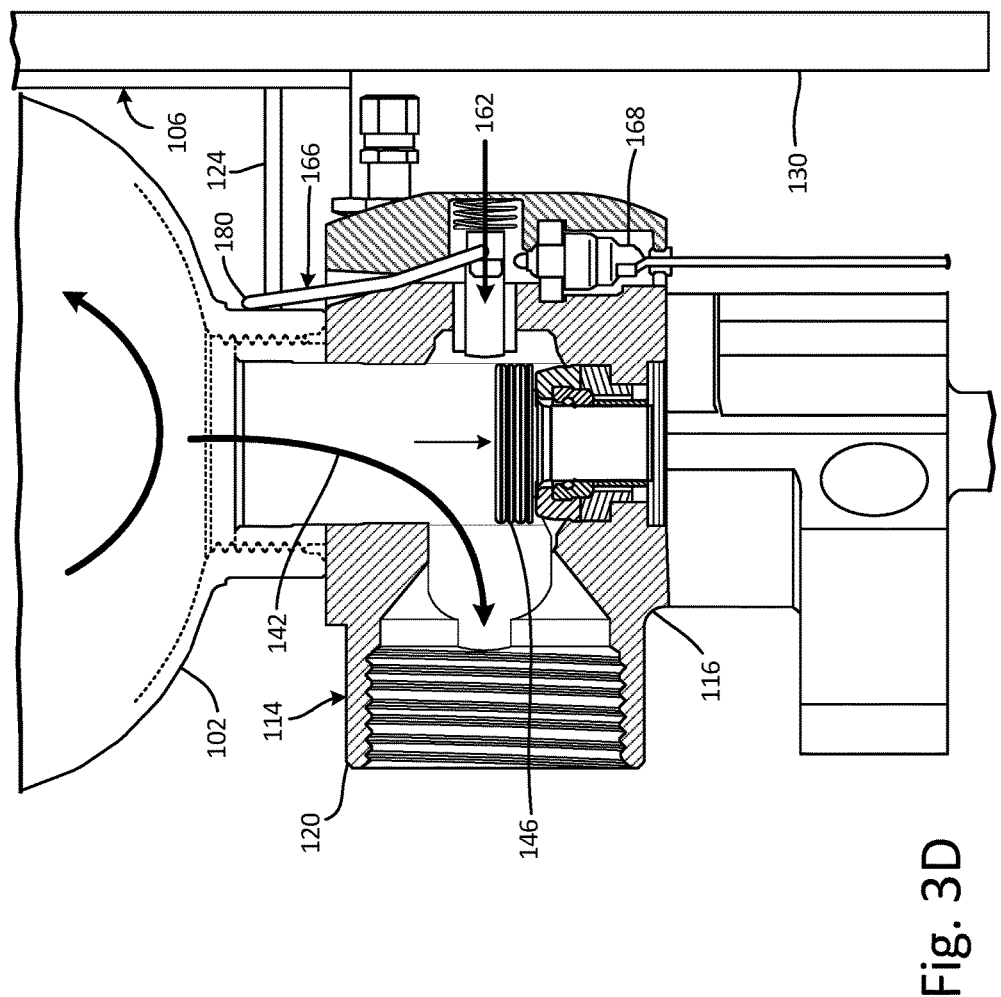
FIG. 3D is a cross-sectional view of the pressure container, the valve assembly, and the mounting bracket of the fire suppression system with the valve assembly in a fourth, fully open position.

FIG. 3D is a cross-sectional view of pressure container 102, valve assembly 114, and mounting bracket 106 with valve assembly 114 in a fourth, fully open position. FIG. 3D shows lever 166 in an engaged position (second end 180 of lever 166 is pushed to the left in FIG. 3D), pin 162 is actuated into an unblocking position (pin 162 is moved to the right in in FIG. 3D), and poppet 146 is in a fully open position (poppet 146 has moved in a downward direction in FIG. 3D) fully opening flow passage 142.

As shown in FIG. 3D, only upon correct installation of pressure container 102 in mounting bracket 106, and resulting full actuation of lever 166 from an un-engaged position into an engaged position from engagement with lip 124, will poppet 146 of valve assembly 114 be allowed to open completely into a fully open position allowing the fire extinguishing agent to be expelled from fire suppression system 100 at a high rate of discharge.

In another non-limiting embodiment, a method of installing fire suppression system 100 can include drawing pressure container 102 and valve assembly 114 into mounting bracket 106. Lip 124 of mounting bracket 106 is pressed into lever 166 extending from HRD valve 116. Lever 166 is pivoted relative to HRD valve 116. Pin 162 that is pivotably attached to lever 166 is translated out of pathway $P_{path}$ of poppet 146 of HRD valve 116. A position of pin 162 is sensed with sensor 168. Pressure container 102 and valve assembly 114 are secured to mounting bracket 106. Pressure container 102 and valve assembly 114 are rotated relative to mounting bracket 106. An anti-recoil cap (not shown in FIG. 3D) is removed from exit port 120 of HRD valve 116 after installation is completed and arms 128 are securely holding pressure container 102 in bracket 106. Conduit 110 is attached to exit port 120 of HRD valve 116, conduit 110 including nozzle 108 located at an end of conduit 110 opposite HRD valve 116. (As shown in FIG. 1).

Discussion of Possible Embodiments

The following are non-exclusive descriptions of possible embodiments of the present invention.

A valve assembly can include a valve with a valve body and a chamber. A poppet can be positioned in the valve and slidably engaged with the valve body, wherein the poppet can comprise a stem and a piston. A poppet release mechanism can be included for releasing the poppet from a closed position. A mechanism cover can be attached to the valve body. A safety mechanism can be included for preventing the poppet from moving into a fully open position unless the safety mechanism is disengaged. The safety mechanism can include a pin, spring, and/or lever. The pin can be positioned such that a first end of the pin can extend into the chamber of the valve into a pathway of the poppet and a second end of the pin can extend into a body of the valve. The spring can be positioned between and in contact with the pin and the mechanism cover to bias the pin toward the poppet. A first end of the lever can be pivotably attached to the pin and a second end of the lever can extend out from the valve body so that the lever can maintain the pin in a blocking position until the second end of the lever is pushed and the first end of the lever translates the pin out of a blocking position and into an un-blocking position.

The valve assembly of the preceding paragraph can optionally include, additionally and/or alternatively, any one or more of the following features, configurations and/or additional components.

The valve assembly can further comprise a sensor disposed in the valve body and adjacent to the pin, wherein the sensor can identify a position of the pin by sensing whether the pin is in contact with the sensor.

The pin can further comprise an angled portion on the second end of the pin, the angled portion can be configured to come into contact with the sensor.

A bushing can be disposed in the valve body, wherein the bushing can surround the pin, and further wherein the bushing can comprise a malleable metal material.

A pivot of the lever can be positioned between the first and second ends of the lever such that as the second end of the lever is moved the first end of the lever can be moved and the pin can be translated.

The lever can extend across a neck portion that spans across a distance of an inlet of the valve.

A fire suppression system can include a pressure container, a mounting bracket, and/or a high speed valve. The pressure container can hold a fire extinguishing agent and can include a neck portion. The mounting bracket can receive the pressure container and can prevent relative motion between the pressure container and the mounting bracket. The high speed valve can be connected to the pressure container and can include a valve body, a poppet, a pin, and/or a lever. The valve body can have a flow passage from an inlet connected to the pressure container to an exit port of the high speed valve. The poppet can be disposed within the valve body and can be movable between a fully closed position in which the poppet fully blocks the flow passage, a partially open position in which the poppet partially opens the flow passage, and/or a fully open position in which the poppet fully opens the flow passage. The poppet can include a piston connected to a stem at a distal end of the stem. The pin can be positioned such that a first end of the pin can extend into a chamber of the high speed valve into a pathway of the poppet and a second end of the pin can extend into a body of the high speed valve. The pin can be movable between a blocking position in which the pin can block the poppet from fully opening the flow passage and an un-blocking position in which the pin can be removed from a pathway of the poppet to allow the poppet to fully open the flow passage. The lever can be pivotably attached to the pin for moving the pin out of the pathway of the poppet to permit the poppet to fully open the flow passage. A first end of the lever can engage the pin and a second end of the lever can extend out from the valve body and span across the neck portion of the pressure container. The second end of the lever can engage with the mounting bracket when the pressure container is drawn into the mounting bracket, the lever can be pushed by the mounting bracket, and the first end of the lever can translate the pin out of a blocking position and into an un-blocking position.

The fire suppression system of the preceding paragraph can optionally include, additionally and/or alternatively, any one or more of the following features, configurations and/or additional components.

A pivot of the lever can be positioned between the first and second ends of the lever such that as the second end of the lever is engaged the first end of the lever can be moved and the pin can be translated.

A conduit can be connected to the exit port and fluidly connected to the flow passage of the high speed valve.

A nozzle can be connected to the conduit and configured to disperse the fire extinguishing agent upon opening of the high speed valve.

A sensor can be disposed in the valve body and adjacent to the pin, wherein the sensor can provide a signal that indicates a position of the pin by sensing whether the pin is in contact with the sensor.

The pin can further comprise an angled portion on the second end of the pin, the angled portion configured to come into contact with the sensor.

A bushing can be disposed in the valve body, wherein the bushing can surround the pin, and further wherein the bushing can comprise a malleable metal material.

The mounting bracket can further comprise a lip extending outwards from a base portion of the mounting bracket for engaging with the lever.

A fire suppression system for a vehicle with a wall can include an extinguisher and a mounting bracket. The extinguisher can include a pressure container and a valve assembly. The valve assembly can be threadably engaged with neck portion of the pressure container and can include a valve, a pin, a lever, and/or an exit port. The valve can include a poppet and a chamber. The pin can be positioned such that a first end of the pin can extend into the chamber of the valve into a pathway of the poppet and a second end of the pin can extend into a body of the valve. The pin can be movable between a blocking position in which the pin blocks the poppet from moving into a fully open position and an un-blocking position in which the pin can be removed from a pathway of the poppet to allow the poppet to fully open the flow passage. The lever can include a pivot and can be pivotably attached to the pin. A first end of the lever can engage the pin and a second end of the lever can extend out from the valve body and can span across the neck portion of the pressure container. The exit port can be in fluid communication with the chamber. The mounting bracket can receive the fire suppression system and can prevent relative motion between the fire suppression system and the wall of the vehicle. A lip can extend outwards from a base portion of the mounting bracket for engagement with the second end of the lever to cause the first end of the lever to translate the pin out of a blocking position and into an un-blocking position.

The fire suppression system of the preceding paragraph can optionally include, additionally and/or alternatively, any one or more of the following features, configurations and/or additional components.

The second end of the lever can engage with the lip of the mounting bracket when the pressure container is drawn into the mounting bracket, and further wherein the pivot of the lever can be positioned between the first and second ends of the lever such that as the second end of the lever is engaged the first end of the lever can be moved and the pin can be translated.

A conduit can be connected to the exit port and fluidly connected to the flow passage of the high speed valve, and/or a nozzle configured to disperse the fire extinguishing agent upon opening of the high speed valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve assembly comprising:
    a valve with a valve body and a chamber;
    a poppet positioned in the valve and slidably engaged with the valve body, wherein the poppet comprises a stem and a piston;
    a poppet release mechanism for releasing the poppet from a closed position;
    a mechanism cover attached to the valve body; and
    a safety mechanism for preventing the poppet from moving into a fully open position unless the safety mechanism is disengaged, wherein the safety mechanism comprises:
        a pin positioned such that a first end of the pin extends into the chamber of the valve into a pathway of the poppet and a second end of the pin extends into the valve body;
        a spring positioned between and in contact with the pin and the mechanism cover, wherein the spring biases the pin toward the poppet; and
        a lever, wherein a first end of the lever is pivotably attached to the pin and a second end of the lever extends out from the valve body so that the lever will maintain the pin in a blocking position until the second end of the lever is pushed and the first end of the lever translates the pin out of the blocking position and into an un-blocking position.

2. The valve assembly of claim 1, further comprising:
    a sensor disposed in the valve body and adjacent to the pin, wherein the sensor identifies a position of the pin by sensing whether the pin is in contact with the sensor.

3. The valve assembly of claim 2, wherein the pin further comprises:
    an angled portion on the second end of the pin, the angled portion configured to come into contact with the sensor.

4. The valve assembly of claim 1, further comprising:
    a bushing disposed in the valve body, wherein the bushing surrounds the pin, and further wherein the bushing comprises a malleable metal material.

5. The valve assembly of claim 1, further wherein a pivot of the lever is positioned between the first and second ends of the lever such that as the second end of the lever is moved the first end of the lever is moved and the pin is translated.

6. The valve assembly of claim 1, wherein the lever extends across a neck portion that spans across a distance of an inlet of the valve.

* * * * *